United States Patent
Nomura et al.

(10) Patent No.: US 7,037,616 B2
(45) Date of Patent: May 2, 2006

(54) FUEL CELL SYSTEM HAVING DRAIN FOR CONDENSED WATER STORED IN REFORMING REACTOR

(75) Inventors: Tadashi Nomura, Wako (JP); Yasunori Kotani, Wako (JP); Hikaru Okada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 400 days.

(21) Appl. No.: 10/035,065

(22) Filed: Dec. 27, 2001

(65) Prior Publication Data

US 2002/0081469 A1    Jun. 27, 2002

(30) Foreign Application Priority Data

Dec. 27, 2000    (JP)    ............................. P2000-396801

(51) Int. Cl.
  *H01M 2/02*  (2006.01)
  *H01M 2/00*  (2006.01)

(52) U.S. Cl. ............................. 429/34; 429/19; 429/22; 429/13; 429/26

(58) Field of Classification Search ................. 429/19, 429/34, 22, 13, 17
See application file for complete search history.

(56) References Cited

U.S. PATENT DOCUMENTS

| | | | | | |
|---|---|---|---|---|---|
| 4,120,787 A | * | 10/1978 | Yargeau | ....................... | 210/664 |
| 4,872,975 A | * | 10/1989 | Benson | ......................... | 210/99 |
| 6,162,558 A | * | 12/2000 | Borup et al. | .................. | 429/19 |
| 6,759,154 B1 | * | 7/2004 | O'Brien et al. | ................ | 429/17 |

FOREIGN PATENT DOCUMENTS

| | | |
|---|---|---|
| JP | 5-290865 | 11/1993 |
| JP | 7-192742 | 7/1995 |
| JP | 7-240223 | 9/1995 |
| JP | 2000-223144 | * 8/2000 |

\* cited by examiner

*Primary Examiner*—Patrick Joseph Ryan
*Assistant Examiner*—Angela J. Martin
(74) *Attorney, Agent, or Firm*—Lahive & Cockfield, LLP; Anthony A. Laurentano, Esq.

(57) ABSTRACT

A fuel cell system having a reforming reactor is disclosed, in which condensed water generated in the reforming reactor is drained during the warming-up of the system, so as to quickly complete the warming-up. The system comprises a fuel cell for generating power by using a supplied fuel gas and oxidizing gas; a reforming reactor for reforming original fuel gas so as to produce a reformed fuel gas which is supplied to the fuel cell; and a drain for condensed water stored in the reforming reactor. A water-collecting portion is formed by a plurality of sloped portions and is attached to the bottom of the reforming reactor, and the drain is connected to the water-collecting portion.

16 Claims, 6 Drawing Sheets

FUEL CELL SYSTEM HAVING DRAIN FOR CONDENSED WATER STORED IN REFORMING REACTOR

BACKGROUND OF THE INVENTION

1. Field of the Invention

The present invention relates to a fuel cell system having a reforming reactor for reforming hydrocarbon fuel to hydrogen-rich gas, and in particular, to those having a reforming reactor which has superior starting characteristics.

2. Description of the Related Art

Japanese Unexamined Patent Application, First Publication Nos. Hei 5-290865, Hei 7-192742, and Hei 7-240223 disclose examples of fuel cell systems, in which hydrocarbon fuel such as methanol is reformed to hydrogen-rich fuel gas by using a reforming reactor, and the reformed fuel gas and an oxidizing gas such as air are supplied to the fuel cells, thereby generating power.

Such a fuel cell system must be warmed up so as to start the system. An example of the warming-up method will be explained with reference to FIG. 5.

Figure 5:
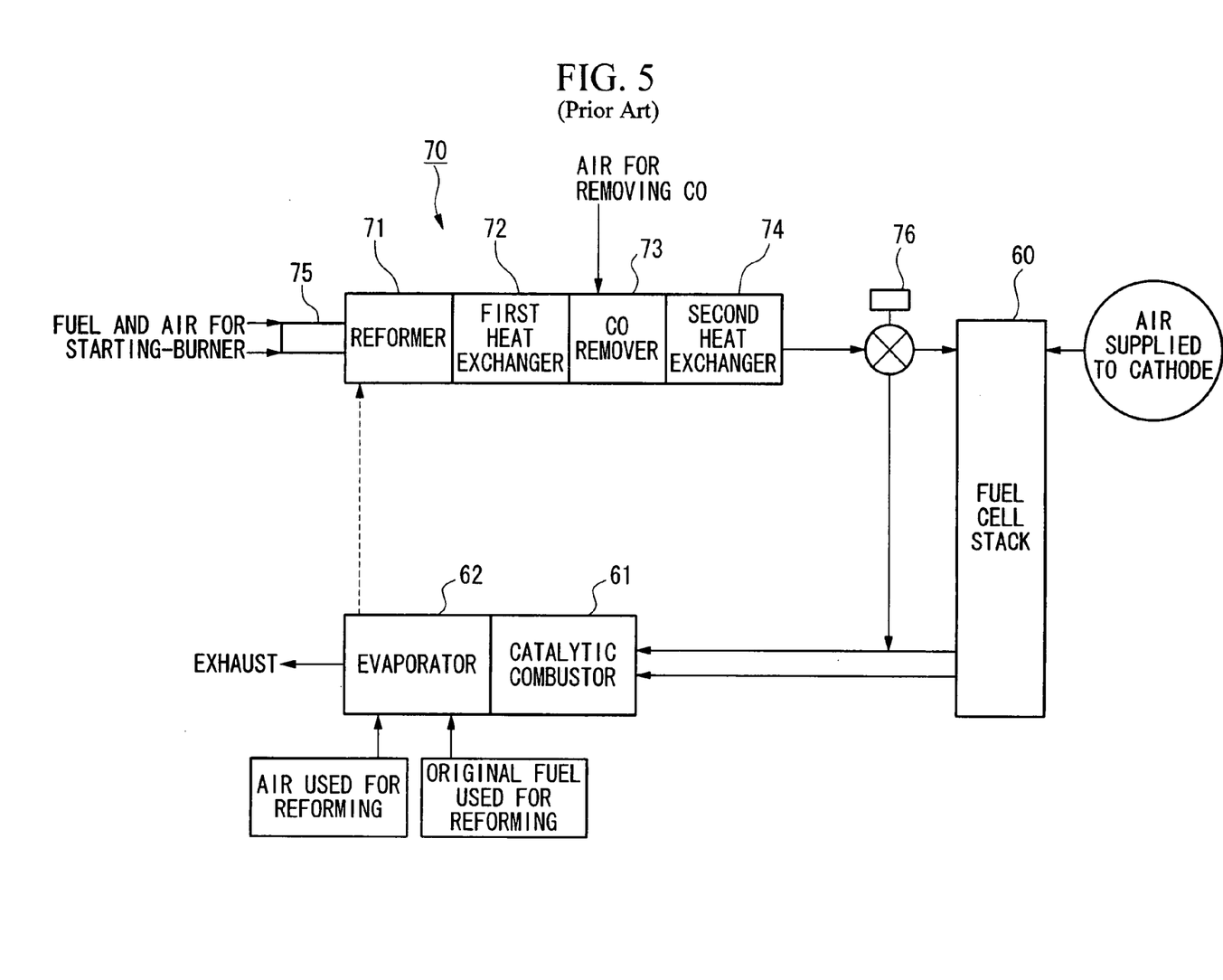
FIG. 5 is a diagram showing the general structure of a conventional fuel cell system having a reforming reactor.

FIG. 5 shows the general structure of a fuel cell system which can be warmed up at the starting time. In the figure, reference numeral 70 indicates a reforming reactor which comprises an autothermal reformer 71 for reacting evaporated fuel and air (for reforming) with each other and obtaining reformed hydrogen-rich gas; a first heat exchanger 72 for decreasing the temperature of the reformed gas which is generated by the reformer 71; a CO remover 73 for oxidizing the CO included in the reformed gas so as to generate $CO_2$; and a second heat exchanger 74 for decreasing the temperature of the reformed gas from which the CO has been removed to a certain temperature so that the reformed gas can be supplied to a fuel cell stack 60.

The reformed gas generated by the reforming reactor 70 is supplied as fuel gas to an anode of the fuel cell stack 60. The supplied gas reacts with air which is supplied to a cathode and which functions as an oxidizing gas, thereby generating power. If the CO content of the reformed gas supplied to the fuel cell stack 60 is high, the anode of the fuel cell stack 60 is subjected to CO poisoning, and the output power is decreased. Therefore, CO is removed from the reformed gas by using the CO remover 73.

After the power generation, the fuel gas which was supplied to the anode is discharged as "off gas" from the fuel cell stack 60, and the discharged gas is transferred to a catalytic combustor 61. In this catalytic combustor 61, the hydrogen which remains in the off gas is combusted, so that the temperature of the off gas increases and this heated off gas is supplied to an evaporator 62. This evaporator 62 is provided for heating and evaporating the original fuel, which is supplied to the reforming reactor 70, by using the waste heat of the off gas, so that evaporated fuel is obtained. The evaporated fuel is supplied to the reformer 71 of the reforming reactor 70 together with the heated air used for reforming, and the off gas is discharged from the evaporator 62.

A starting burner 75 is provided at the reformer 71 of the reforming reactor 70. The original fuel and air can also be supplied to the starting burner 75 and they are supplied only when the system is warmed up at the system start, so that the burner 75 is ignited. The high-temperature combustion gas generated by the burner 75 is transferred to the reformer 71, and the air and original fuel, which are used for reforming, are supplied via the evaporator 62 to the reformer 71. In the warming-up of the fuel cell system, a three-way valve 76 is controlled so as to shut off the flow drawn into the fuel cell stack 60 until the warming-up of the reforming reactor 70 is completed.

If the HC content of the reformed gas supplied to the fuel cell stack 60 is high, the anode or a solid polymer membrane will be adversely effected, thereby causing a power reduction. Therefore, the completion of the warming-up of the system may be determined by determining whether the composition of the reformed gas has been stabilized, for example, whether the HC content has been stabilized at a specific level.

However, in the conventional method of warming up the fuel cell system, the water vapor generated by combustion using the burner 75 and the reformer 71 is condensed inside the "cold" reforming reactor 70 before the completion of the warming-up, so that waterdrops are produced and remain inside the system. In addition, the HC component of the reformed gas is dissolved in the condensed water; therefore, the condensed water has a high HC content. As the warming-up progresses, the condensed water is again evaporated and the evaporated component is diffused in the reformed gas; thus, the reforming reactor 70 is further warmed up after the dew point, and the HC content of the reformed gas does not stabilize until the condensed water is completely evaporated and disappears. Therefore, this system has the problem that a long time is required to complete the warming-up process.

Figure 6:
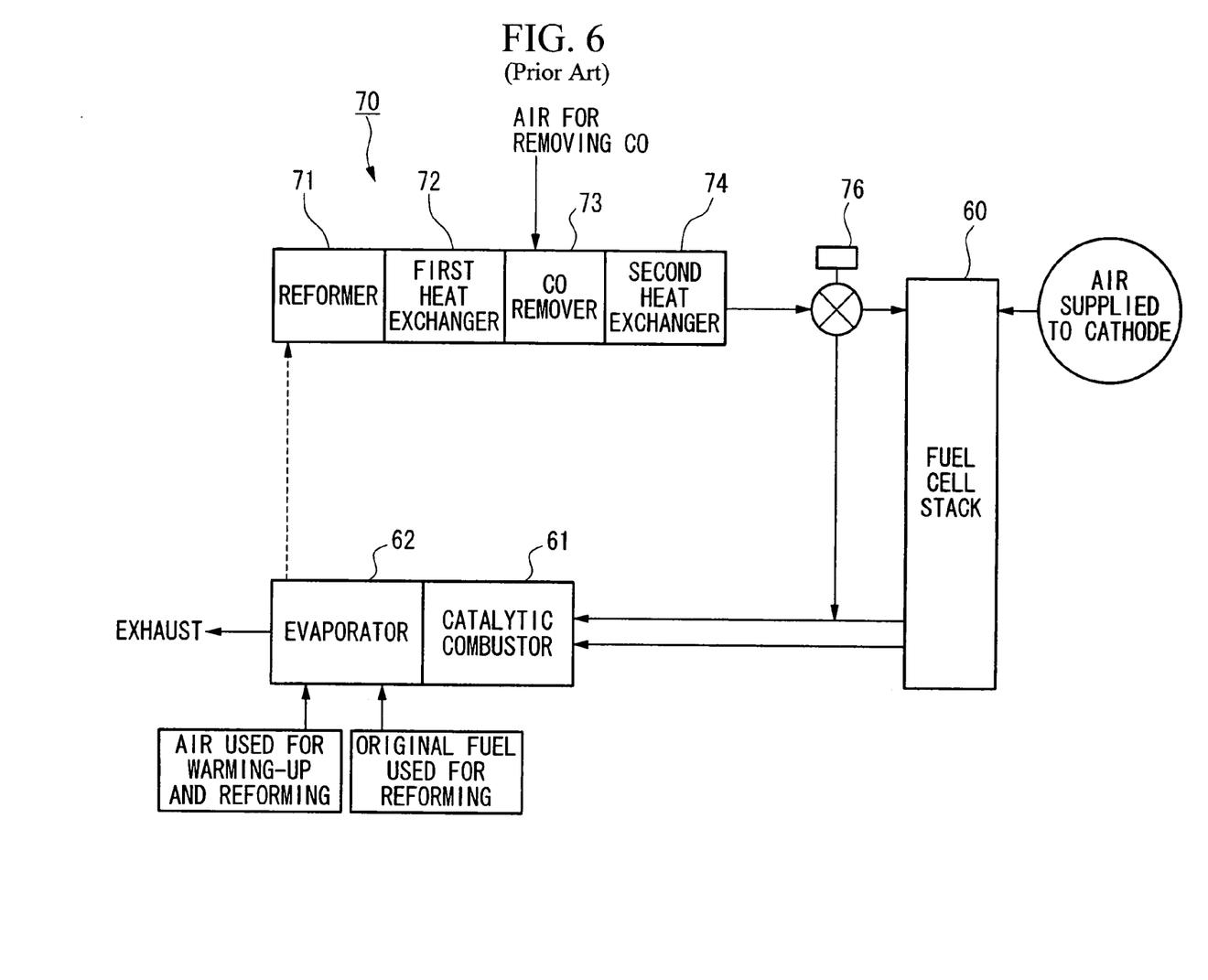
FIG. 6 is a diagram showing the general structure of another conventional fuel cell system having a reforming reactor.

In order to avoid water-vapor generation due to the burner 75, the system shown in FIG. 6, in which the burner 75 is omitted, may be used. In the warming-up when the system is started, the amount of air supplied to the evaporator 62 is larger than that supplied during the normal operation, and a large amount of the high-temperature air heated by the evaporator 62 is supplied to the reformer 71, thereby warming up the fuel cell system.

However, also in this method, the water vapor in the air is condensed in the reforming reactor 70, which has not yet been fully warmed up. Therefore, this system also has the problem explained above. In addition, this system employs no burner (75) and the warming-up is performed by only using heated air. In this case, the quantity of the supplied heat is smaller in comparison with the system having the burner. Therefore, a longer time is required before the warming-up is completed.

SUMMARY OF THE INVENTION

In consideration of the above circumstances, an object of the present invention is to provide an fuel cell system having a reforming reactor, in which no condensed water remains inside the system during the warming-up, and the warming-up can be quickly completed.

Therefore, the present invention provides a fuel cell system (e.g., fuel cell systems 1 and 100 in embodiments explained below) having a reforming reactor, the system comprising:

a fuel cell fuel (e.g., a fuel cell stack 20 in the embodiments explained below) for generating power by using a supplied fuel gas and oxidizing gas;

a reforming reactor (e.g., a reforming reactor 10 in the embodiments explained below) for reforming original fuel gas so as to produce a reformed fuel gas which is supplied to the fuel cell; and a drain (e.g., drain passages 41 to 44 in the embodiments explained below) for condensed water stored in the reforming reactor.

According to the above structure, the condensed water generated in the reforming reactor can be drained outside the reforming reactor by using the drain, so that the condensed water does not remain in the reforming reactor. In particular, when the system is warmed up to be started, the heat necessary for the warming-up is not instead used as the evaporative latent heat of the condensed water, and redissolution of HC in the reformed gas into the condensed water is prevented. Consequently, the time necessary for warming up the fuel cell system can be reduced and the composition of the reformed gas can be quickly stabilized.

The fuel cell system may further comprise a water-collecting portion (e.g., water-collecting portions 11a to 14a in the embodiments explained below) which is formed by a plurality of sloped portions and which is attached to the bottom of the reforming reactor, wherein the drain is connected to the water-collecting portion. Accordingly, the condensed water generated in the reforming reactor can be reliably and efficiently drained. Therefore, the time necessary for warming up the fuel cell system can be much reduced and the composition of the reformed gas can be much more quickly stabilized.

The fuel cell system may further comprise a tank (e.g., a tank 47 in the embodiments explained below), provided at the downstream side of the drain, for storing the condensed water. Accordingly, the condensed water drained from the reforming reactor can be temporarily stored, thereby preventing the condensed water from flowing unrestrainedly. Therefore, it is possible to prevent the vicinity of the reforming reactor from being polluted.

The fuel cell system may further comprise a purifier (e.g., a catalytic combustor 30 in the embodiments explained below) for the condensed water. Accordingly, the condensed water drained from the reforming reactor can be purified and then discharged outside the system. If the above-explained tank is also provided, the capacity of the tank can be small. Therefore, the device size of the fuel cell system (having a reforming reactor) can be small.

If the above-explained tank is provided, the fuel cell system may further comprise a flow control device (e.g., an orifice 48 in the first embodiment or a flow control valve 53 in the second embodiment explained below), provided at the downstream side of the tank, for controlling the flow of the condensed water; and a purifier (e.g., a catalytic combustor 30 in the embodiments explained below) for the condensed water, the purifier being provided at the downstream side of the flow control device. Accordingly, a specific quantity of the condensed water, which is suitable for the purifying capability of the purifier, can be supplied to the purifier. Therefore, it is possible to prevent non-purified condensed water from being drained.

The purifier may be a combustor (e.g., a catalytic combustor 30 in the embodiments explained below) for off-gas discharged from the fuel cell. Accordingly, (i) the combustion of the off gas and (ii) the purification and discharge of the discharge-restricted components such as HC can be performed by a single combustor. Therefore, the necessary structural parts or elements can be reduced, thereby reducing the manufacturing costs.

The fuel cell system may further comprise:

a water-level detector (e.g., a water level sensor 51 in the second embodiment explained below), attached to the tank, for detecting the water level of the condensed water stored in the tank, wherein:

the flow control device as explained above is a flow control valve (e.g., a flow control valve 53 in the second embodiment explained below); and the flow control valve is controlled based on detected results of the water-level detector.

According to this structure, the flow control valve is opened so as to transfer the condensed water in the tank to the purifier only when a predetermined quantity of the condensed water is stored in the tank. Therefore, it is possible to prevent the gas in the reforming reactor from being unnecessarily discharged. Accordingly, the fuel gas is not wasted, and can be efficiently used.

The fuel cell system may further comprise:

a purification determining section (e.g., an FCECU 200 in the second embodiment explained below) for determining whether purification of the condensed water by using the purifier is possible in the current state of the fuel cell system, wherein:

the flow control device as explained above is a flow control valve (e.g., a flow control valve 53 in the second embodiment explained below); and the flow control valve is controlled based on determined results of the purification determining section.

According to this structure, the flow control valve can be opened when purification of the condensed water by using the purifier is possible, so that the condensed water in the tank is transferred to the purifier. Conversely, when purification of the condensed water by using the purifier is possible, the flow control valve can be closed so as not to transfer the condensed water in the tank to the purifier. Therefore, it is possible to prevent non-purified condensed water from being drained and also to prevent the function of an evaporator (typically connected to the purifier) from being degraded as the condensed water is processed.

The flow control device may be an orifice (e.g., an orifice 48 in the first embodiment explained below). Accordingly, it is possible to easily control the quantity of the condensed water supplied to the purifier in a manner such that a specific quantity of the condensed water, which is suitable for the purifying capability of the purifier, is supplied. Therefore, the system structure can be simple, and the manufacturing costs can be reduced.

It is also possible that:

the reforming reactor comprises a plurality of serially-connected functional elements; and a water-collecting portion which is formed by a plurality of sloped portions and which is attached to the bottom of each functional element of the reforming reactor, wherein the drain is connected to the water-collecting portions.

In this structure, the functional elements may include a heat exchanger for decreasing the temperature of the fuel gas. In addition, the functional elements may include a CO remover for oxidizing CO included in the fuel gas so as to generate $CO_2$.

It is also possible that:

the combustor is a catalytic combustor; and the purification determining section determines that the purification of the condensed water using the purifier is possible if the temperature of catalyst of the catalytic combustor is equal to or above a predetermined temperature and the water level of the condensed water in the tank is equal to or above a predetermined level.

DESCRIPTION OF THE PREFERRED EMBODIMENTS

Hereinafter, embodiments of the fuel cell system having a reforming reactor according to the present invention will be explained in detail with reference to the drawings (FIGS. 1 to 4). In the following embodiments, each fuel cell system having a reforming reactor is built into a fuel cell vehicle.

First Embodiment

The first embodiment of the fuel cell system having a reforming reactor according to the present invention will be explained with reference to FIG. 1.

Figure 1:
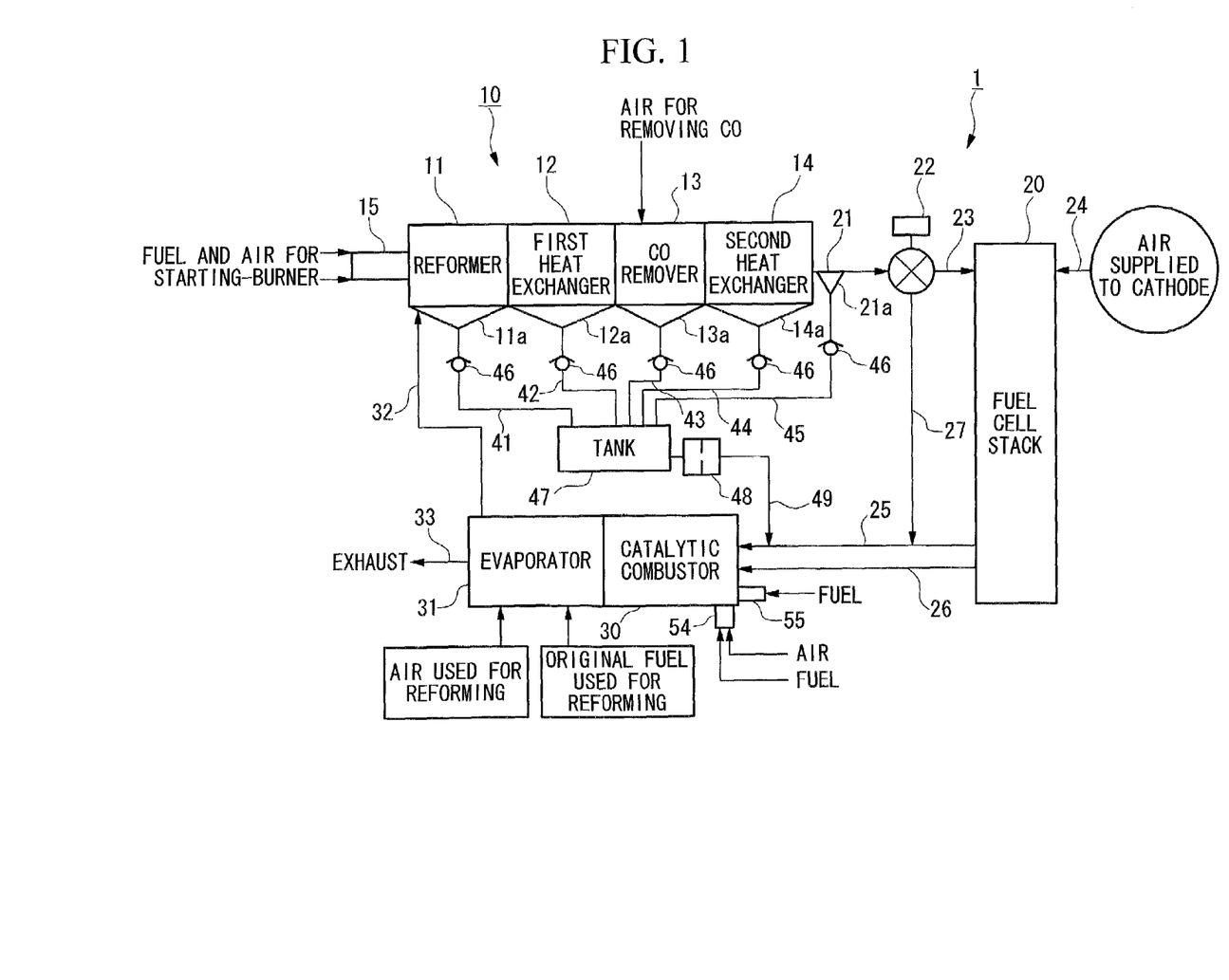
FIG. 1 is a diagram showing the general structure of the first embodiment of the fuel cell system having a reforming reactor according to the present invention.

FIG. 1 is a diagram showing the general structure of a fuel cell system 1 having a reforming reactor (referred to as the fuel cell system 1, hereinbelow). The reforming reactor 10 comprises an autothermal reformer 11 for reacting evaporated fuel and air (for reforming) with each other so as to obtain reformed hydrogen-rich fuel gas; a first heat exchanger 12 for decreasing the temperature of the reformed fuel gas which is generated by the reformer 11; a CO remover 13 for oxidizing the CO in the fuel gas by introducing air, so as to generate $CO_2$; a second heat exchanger 14 for decreasing the temperature of the fuel gas from which the CO has been removed to a certain temperature so that the fuel gas can be supplied to a fuel cell stack 20; and a starting burner 15 which is attached to the reformer 11.

In the above structure, original fuel and air can be supplied to the burner 15 and they are supplied only during the warming-up at the system start, thereby igniting the burner 15. Specifically, the original fuel is a mixture liquid obtained by mixing a hydrocarbon fuel (such as methanol or gasoline) with water at a specific mixing ratio.

In addition, water-collecting portions 11a, 12a, 13a, and 14a are respectively provided at the bottom portions of the reformer 11, the first heat exchanger 12, the CO remover 13, the second heat exchanger 14, where each water-collecting portion is formed by a plurality of sloped portions so as to make the collected water fall down along the sloped portions.

The fuel gas reformed by the reforming reactor 10 is supplied via the second heat exchanger 14, fuel gas supply passages 21 and 23, and a three-way switching valve 22 to an anode of the fuel cell stack 20 (i.e., the fuel cell of the present invention) which is of a solid polymer electrolyte membrane type. The fuel gas supply passage 21 for connecting the second heat exchanger 14 and the three-way switching valve 22 has a water-collecting portion 21a which is formed by a plurality of sloped portions.

In the above structure, air which functions as an oxidizing gas can be supplied from a supercharger (not shown) to a cathode of the fuel cell stack 20 via an air supply passage 24. The hydrogen in the fuel gas supplied to the anode and oxygen in the air supplied to the cathode electrochemically react with each other, thereby generating power.

The fuel gas, which was supplied to the anode of the fuel cell stack 20 and was used in power generation, is then supplied as a fuel off-gas to a catalytic combustor 30 (corresponding to the purifier of the present invention). The air, which was supplied to the cathode and was used in power generation, is then supplied as an air off-gas to the catalytic combustor 30 via an air off-gas passage 26. The three-way switching valve 22 is connected with a fuel off-gas passage 25 via a bypass passage 27 which is provided for bypassing the fuel cell stack 20. The fuel gas supply passage 21 can be selectively connected to any one of the fuel gas supply passage 23 and the bypass passage 27 by using the three-way switching valve 22.

The catalytic combustor 30 is provided for reacting hydrogen which remains in the fuel off-gas and oxygen which remains in the air off-gas with each other (i.e., combustion), and the produced high-temperature combustion gas is transferred to an evaporator 31. At the upstream side of the catalytic combustor 30, an electric heater catalyst 54 used in the warming-up at the system start up (abbreviated as "EHC 54", hereinbelow) and an original-fuel supply section 55 are provided and arranged in parallel to each other. Original fuel and air can be supplied to the EHC 54, while the original fuel can be supplied to the original-fuel supply section 55.

In addition, original fuel for reforming and air for reforming are supplied to the evaporator 31. In the evaporator 31, heat exchange between (i) the supplied original fuel and air for reforming and (ii) the high-temperature combustion gas transferred from the catalytic combustor 30 is performed so that the fuel for reforming evaporates, thereby generating evaporating fuel, and the air for reforming is heated. A mixture of the evaporated fuel and the heated air is supplied from the evaporator 31 via the fuel supply passage 32 to the reformer 11. On the other hand, the combustion gas (i.e., the fuel off-gas and air off-gas) used as a heating source in the evaporator 31, is discharged to the atmosphere via a discharge passage 33.

A plurality of drain passages (corresponding to the drain of the present invention) 41, 42, 43, 44, and 45 are respectively connected to the lower ends of the water-collecting portions 11a, 12a, 13a, 14a, and 21a of the reformer 11, the first heat exchanger 12, the CO remover 13, the second heat exchanger 14, and the fuel gas supply passage 21. A check valve 46 is attached to each drain passage, and the drain passages 41 to 45 are coupled with a tank 47. The tank 47 is connected via a drain passage 49 to the fuel off-gas passage 25. The drain passage 49 has an orifice 48 (corresponding to the flow rate control section of the present invention).

The tank 47 and the orifice 48 are positioned at the lowest part of the water-collecting piping system, which is arranged from the water-collecting portions 11a to 14a and 21a to the fuel off-gas passage 25.

Below, the operation of the fuel cell system 1 will be explained.

The fuel cell system 1 is operated according to the control by a fuel cell control unit (which is not shown and is abbreviated as "FCECU") as follows.

When receiving an operation start signal of the fuel cell system 1, the FCECU energizes the EHC 54 which is provided at the upstream side of the catalytic combustor 30. When the temperature of the EHC 54 reaches a predetermined temperature, original fuel and air are supplied to the EHC 54. When the original fuel is ignited, the FCECU stops energizing the EHC 54 so as to protect the EHC 54, that is, to prevent the EHC 54 from melting. The supply of the original fuel to the EHC 54 is stopped after the temperature of the EHC 54 reaches the predetermined temperature. After that, the original fuel necessary for warming up the evaporator 31 is supplied from the original-fuel supply section 55 (which is positioned upstream of the catalytic combustor 30) to the catalytic combustor 30.

At the same time the EHC 54 is energized, original fuel and air are supplied to the starting burner 15 and the burner is ignited using a glow plug (not shown), so as to combust the original fuel necessary for warming up the reforming reactor 10. At this stage, the warming-up of the evaporator 31 and the reforming reactor 10 have not yet been completed. Therefore, original fuel and air for reforming are not supplied to the evaporator 31. In addition, until the warming-up of the fuel cell system 21 is completed, the fuel gas supply passage 21 and the bypass passage 27 are connected to each other via the valve body (not shown) of the three-way switching valve 22, so that the fuel gas supply passage 23 is disconnected.

The combustion gas, generated by the combustion of the original fuel by using the burner 15, is supplied to the reforming reactor 10, and the supplied combustion gas passes through the reformer 11, the first heat exchanger 12, the CO remover 13, and the second heat exchanger 14. The combustion gas further passes through the fuel gas supply passage 21, the three-way switching valve 22, the bypass passage 27, and the fuel off-gas passage 25, and the combustion gas is then drawn into the catalytic combustor 30. The combustion gas further passes through the evaporator 31, and the combustion gas is finally discharged to the atmosphere.

The combustion gas transferred from the burner 15 includes water vapor which is generated by the combustion using the burner 15. At the time of the system start up, the passage system for sending the fuel gas is cold. Therefore, when this combustion gas passes through the reformer 11, the first heat exchanger 12, the CO remover 13, and the second heat exchanger 14 of the reforming reactor 10, and the fuel gas supply passage 21, the water vapor included in the combustion gas is condensed, thereby producing condensed water. This condensed water is collected at the water-collecting portions 11a to 14a and 21a in turn, and the collected water is drained to the drain passages 41 to 45. At this stage, the differential pressure between the upstream side and the downstream side of each check valve 46 is almost 0; thus, the condensed water does not flow towards the downstream side of the check valve 46.

When a certain time has elapsed from the operation start of the burner 15 and the pressure at the inlet of the catalytic combustor 30 becomes lower than the internal pressure of the reforming reactor 10 at a predetermined differential pressure (e.g., approximately 5 to 30 kPa) according to the flow of combustion gas and the like, then the check valves 46 are opened by this differential pressure and the condensed water in the drain passages 41 to 45 flows towards the downstream side of each check valve 46, so that the condensed water collected in the water-collecting portions 11a to 14a and 21a is drawn into the tank 47. Owing to the above differential pressure, the condensed water in the tank 47 then passes through the orifice 48 and the drain passage 49 and is then drawn into the fuel off-gas passage 25. This condensed water is supplied to the catalytic combustor 30 together with the combustion gas (and the like) which passes through the fuel off-gas passage 25.

In the catalytic combustor 30, the condensed water is evaporated, and (i) the non-combusted fuel component included in the combustion gas and the like and (ii) the discharge-restricted components such as HC included in the condensed water are oxidized and purified, thereby generating a high-temperature purified gas which is drawn into the evaporator 31. In the evaporator 31, heat exchange between this purified gas and the evaporator 31 is performed, and the cooled purified gas is discharged via the discharge passage 33 towards the atmosphere.

The warming-up operation of the fuel cell system 1 is started as explained above.

When the warming-up of the reformer 11, which is arranged at the furthest upstream position in the reforming reactor 10, has completed, the supply of the original fuel and air to the starting burner 15 is stopped. After that, the supply of fuel and air (for reforming) to the evaporator 31 is started, and the heated evaporated fuel and the heated air for reforming are supplied via the fuel supply passage 32 to the reformer 11. In the reformer 1, the evaporated fuel and the air for reforming are subjected to a reforming reaction, thereby generating hydrogen-rich reformed gas.

When this reformed gas passes through the reformer 11, the first heat exchanger 12, the CO remover 13, and the second heat exchanger 14 of the reforming reactor 10, and the fuel gas supply passage 21, the water vapor included in the reformed gas is condensed, thereby producing condensed water. The condensed water is collected in the water-collecting portions 11a to 14a and 21a, and the collected water flows via the drain passages 41 to 45 to the tank 47, and the water is then sent via the orifice 48 and the drain passage 49 to the fuel off-gas passage 25. This water is supplied to the catalytic combustor 30 together with the reformed gas which flows through the fuel off-gas passage 25.

Similar to the above description, the condensed water is evaporated in the catalytic combustor 30, and hydrogen, CO, and the like included in the reformed gas and discharge-restricted components such as HC included in the condensed water are oxidized and purified, thereby producing a high-temperature purified gas, which is drawn into the evaporator 31. In the evaporator 31, heat exchange is performed between this purified gas and the original fuel and the air for reforming. The evaporating fuel and the heated air for reforming are supplied via the fuel supply passage 32 to the reformer 11, and the cooled purified gas is discharged via the discharge passage 33 to the atmosphere.

As explained above, the condensed water condensed in the reforming reactor 10 and the fuel gas supply passage 21 does not remain in the reforming reactor 10 and the fuel gas supply passage 21 but is immediately drained into the tank 47. Therefore, the heat intended for warming up the reforming reactor 10 is not instead used to supply evaporative latent heat of the condensed water, and redissolution of HC in the reformed gas into the condensed water is prevented. Consequently, the time necessary for warming up the fuel cell system 1 can be reduced and the composition of the reformed gas can be quickly stabilized.

After the first heat exchanger 12, the CO remover 13, and the second heat exchanger 14, and the fuel gas supply passage 21 are warmed by the high-temperature reformed gas passing through the same, air for oxidizing the CO included in the reformed gas is introduced into the CO remover 13 so as to adjust the composition of the reformed gas to an allowable value for the fuel cell stack 20. When the composition of the reformed gas becomes stable, the FCECU controls the three-way switching valve 22 so that the fuel gas supply passage 21 and the fuel gas supply passage 23 are connected and the bypass passage 27 is disconnected, thereby supplying the reformed gas to the anode of the fuel cell stack 20. Simultaneously, air is supplied to the cathode of the fuel cell stack 20, so that the fuel cell system enters the standby mode for power generation.

In the fuel cell system 1, condensation water, generated in the system which is cooled after the system step, is also collected in the water-collecting portions 11a to 14a and 21a as in the case of the condensed water which is generated during the warming-up operation at the system start. The collected water is drained to the tank 47 when the system is started the next time.

In the present fuel cell system 1, the water-collecting portions 11a to 14a and 21a, each of which is formed by sloped portions, are respectively provided at the bottom of the reformer 11, the first heat exchanger 12, the CO remover 13, and the second heat exchanger 14 of the reforming reactor 10, and the fuel gas supply passage 21; therefore, the condensed water generated in each water-collecting portion can be reliably and efficiently collected and drained.

Also in the present fuel cell system 1, the condensed water can be temporarily stored in the tank 47. In addition, after the condensed water stored in the tank 47 is drawn into the catalytic combustor 30 in which the condensed water is vaporized and purified, the purified gas is discharged. Therefore, the condensed water is not discharged from the vehicle unrestrainedly.

In addition, the condensed water in the tank 47 is supplied via the orifice 48 to the catalytic combustor 30; thus, the condensed water can be supplied at a specific flow rate suitable for the purifying capability of the catalytic combustor 30. Therefore, it is possible to prevent HC or the like in the condensed water from being discharged in a non-purified liquid from the vehicle.

Additionally, the condensed water in the tank 47 is vaporized and then discharged; therefore, the capacity of the tank 47 can be small and the fuel cell system 1 can be of a small size.

Also in the fuel cell system 1, no dedicated evaporating means for evaporating the condensed water is provided, and the catalytic combustor 30 also functions as means for evaporating the condensed water; thus, the structure of the fuel cell system 1 can be simple, thereby reducing the necessary structural parts or elements and reducing the manufacturing costs.

Also in the fuel cell system 1, the differential pressure between the internal pressure of the reforming reactor 10 and the pressure in the fuel off-gas passage 25 drives the introduction of the condensed water from the water-collecting portions (11a to 14a and 21a) to the tank 47, and the introduction of the condensed water from the tank 47 to the fuel off-gas passage 25. Therefore, it is unnecessary to provide a driving source such as a pump and relevant control device; thus, the fuel cell system 1 can have a simple structure and necessary parts or elements can be reduced, thereby reducing the manufacturing costs.

Furthermore, in the fuel cell system 1, the tank 47 and the orifice 48 are positioned at the lowest position in the water-collecting passage system from the water-collecting passages 11a to 14a and 21a, to the fuel off-gas passage 25. Therefore, immediately before starting the reforming reactor 10, that is, when the catalyst of the catalytic combustor 30 is not yet sufficiently active, it is possible to prevent the condensed water stored in the water-collecting passage system from being supplied to the catalytic combustor 30. Consequently, it is possible to prevent a discharge-restricted component (such as HC) included in the condensed water from being discharged from the vehicle without being purified in the catalytic combustor 30.

Second Embodiment

The second embodiment of the fuel cell system 100 according to the present invention will be explained with reference to FIGS. 2 and 3. The distinctive feature of the second embodiment in comparison with the first embodiment will be explained below.

In the tank 47, a water level sensor 51 (corresponding to the water-level detector of the present invention) is provided for detecting the water level of the condensed water which is stored in the tank 47. In the catalytic combustor 30, a catalyst temperature sensor 52 is provided for detecting the catalyst temperature in the catalytic combustor 30. Additionally, in place of the orifice 48 provided in the first embodiment, a flow control valve 53 (corresponding to the flow control device of the present invention) is attached to the drain passage 49.

Figure 2:
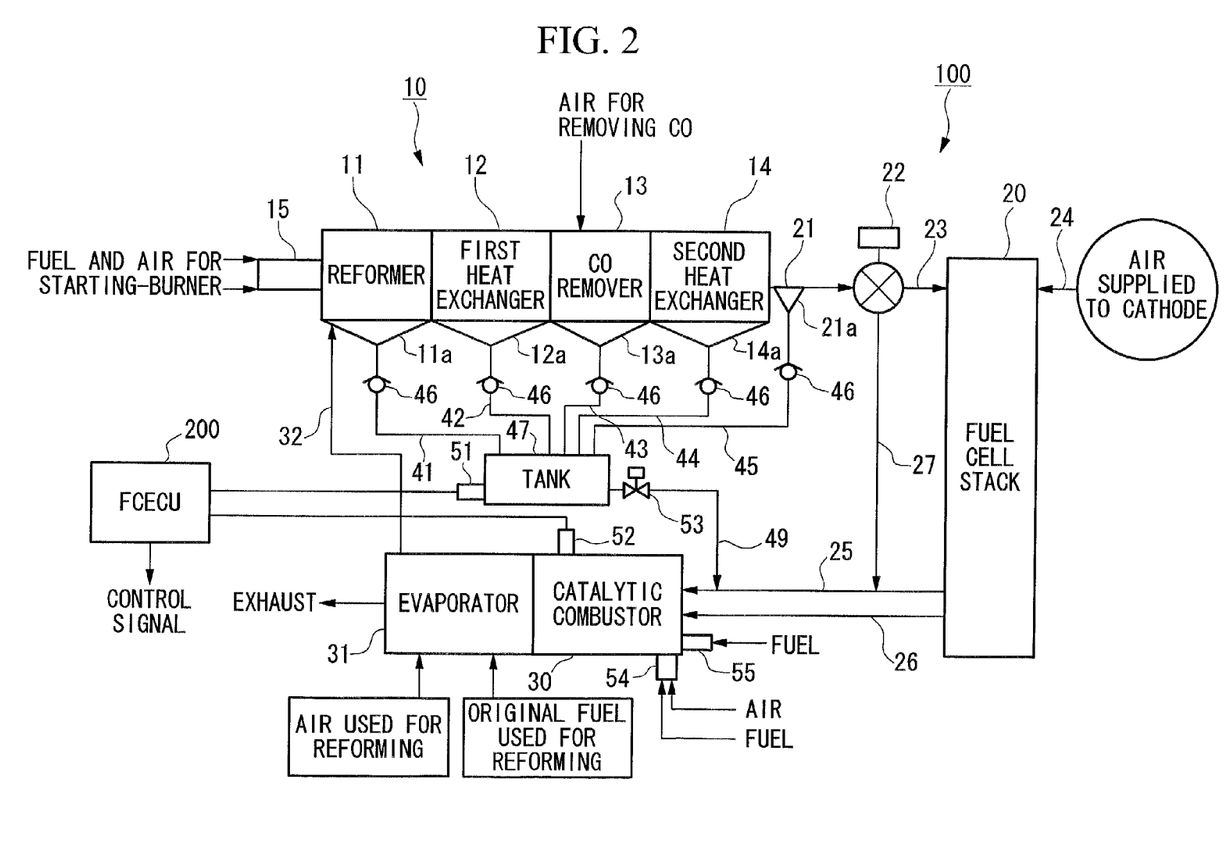
FIG. 2 is a diagram showing the general structure of the second embodiment of the fuel cell system having a reforming reactor according to the present invention.
Figure 3:
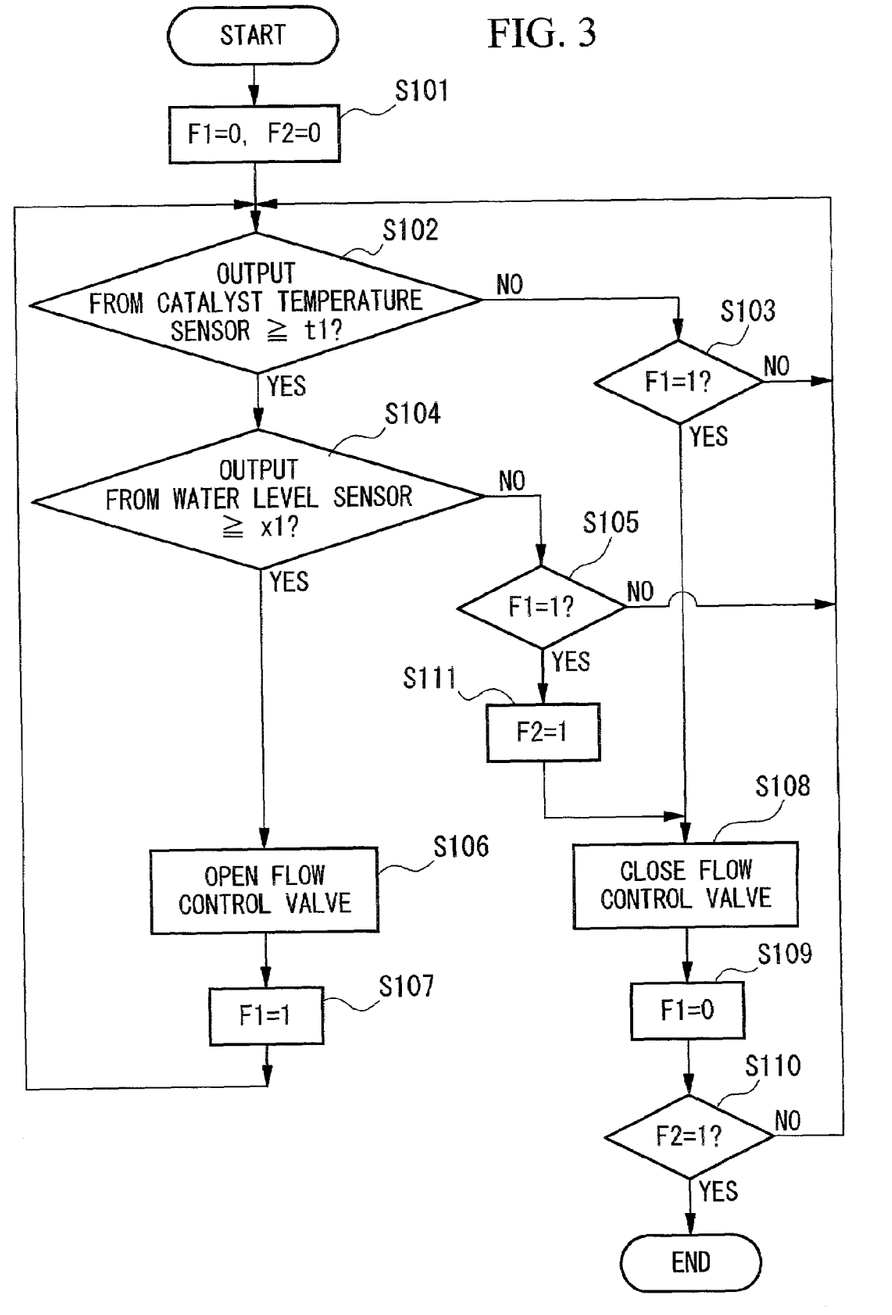
FIG. 3 is a flowchart showing the operation of processing the condensed water in the second embodiment.

The other structural elements are identical to those of the first embodiment; thus, in FIG. 2, parts identical to those in FIG. 1 are given identical reference numerals, and explanations thereof are omitted.

In the fuel cell system 1 in the above-explained first embodiment, the condensed water stored in the tank 47 is immediately drawn via the drain passage 49 and the fuel off-gas passage 25 into the catalytic combustor 30. However, in the fuel cell system 100 of the second embodiment, only when a predetermined quantity of the condensed water is stored in the tank 47 and the catalyst temperature of the catalytic combustor 30 is equal to or above a predetermined level, the stored condensed water is drawn into the catalytic combustor 30.

The operation of processing the condensed water in the second embodiment will be explained with reference to the flowchart in FIG. 3.

Similar to the first embodiment, FCECU 200 (see FIG. 2) first receives an operation starting signal of the fuel cell system 100 and executes the warming-up operation of the fuel cell system 100. Then in the first step S101 of the flowchart, the FCECU 200 sets the values of flags F1 and F2 to 0. The value of the flag F1 indicates the degree of opening of the flow control valve 53, where the value "1" indicates the open state while the value "0" indicates the close state. The value of the flag F2 indicates the state relating to the operation of processing the condensed water, where the value "1" indicates a state in which the operation has been completed while the value "0" indicates a state in which the operation has not been executed or is under execution. Therefore, the setting of the value of flag F1 to "0" means that the initial state of the flow control valve 53 is set to the closed state at the system start.

In the next step S102, it is determined whether the output value from the catalyst temperature sensor 51 is equal to or above t1. The output value t1 corresponds to the lower limit temperature at which (i) the catalyst of the catalytic combustor 30 can be activated, (ii) an amount of heat necessary for the evaporator 31 can be supplied even when condensed water is drawn into the catalytic combustor 30, and (iii) the condensed water can be purified.

If the catalyst temperature of the catalytic combustor 30 has not yet reached the lower limit temperature and thus the result of the determination in step S102 is "NO", then the operation proceeds to step S103, where it is determined whether the value of the flag F1 is 1. If the result of the determination in step S103 is "NO", then the operation returns to step S102.

Conversely, if the catalyst temperature of the catalytic combustor 30 is equal to or above the lower limit temperature (i.e., the activation temperature) and thus the result of the determination of step S102 is "YES", then the operation proceeds to step S104, where it is determined whether the output value of the water level sensor 51 is equal to or above x1. The output value x1 corresponds to the water level at which a predetermined quantity of the condensed water is stored in the tank 47 and the condensed water should be drained.

If the water level of the condensed water in the tank 47 has not yet reached the predetermined level and thus the result of the determination of step S104 is "NO", then the operation proceeds to step S105, where it is determined whether the value of the flag F1 is 1. If the result of the determination of step S105 is "NO", then the operation returns to step S102.

Conversely, if the water level of the condensed water in the tank 47 is equal to or above the predetermined level and thus the result of the determination of step S104 is "YES", then the operation proceeds to step S106, where the flow control valve 53 is opened. In the following step S107, the value of the flag F1 is set to 1, then the operation returns to step S102. That is, if the catalyst temperature of the catalytic combustor 30 is equal to or above the lower limit temperature and the water level of the condensed water in the tank 47 is equal to or above the predetermined level, then the flow control valve 53 is opened. Consequently, if the differential pressure between the internal pressure of the reforming reactor 10 and the pressure in the fuel off-gas passage 25 reaches the above-explained predetermined level or more, the condensed water in the tank 47 is drawn via the drain passage 49 and the fuel off-gas passage 25 into the catalytic combustor 30.

The steps from S102→S104→S106→S107 to S102 are repeated while the result of the determination of each of steps S102 and S104 is "YES".

If the catalyst temperature of the catalytic combustor 30 becomes lower than the above-described lower temperature before the water level of the condensed water in the tank 47 falls below the above-described predetermined level, then the result of the determination in step S102 is "NO" and the operation proceeds to step S103. At this stage, the value of the flag F1 is 1; thus, the result of the determination in step S103 is "YES", and the operation proceeds to step S108. In step S108, the flow control valve 53 is closed, and in the next step S109, the value of the flag F1 is set to 0. In the following step S110, it is determined whether the value of the flag F2 is 1. At this stage, the value of the flag F2 is 0; thus, the result of the determination is "NO", and the operation returns to step S102.

If the water level of the condensed water in the tank 47 falls below the predetermined level and the result of the determination in step S104 is "NO" while the steps from S102 to S107 are repeated; then the operation proceeds to step S105, where it is determined whether the value of the flag F1 is 1. At this stage, the value of the flag F1 is 1; thus, the result of the determination in step S105 is "YES", and the operation proceeds to step S111. In step S111, the value of the flag F2 is set to 1.

In step S108, the flow control valve 53 is closed, and in the next step S109, the value of the flag F1 is set to 0. The operation then proceeds to step S110 and it is determined whether the value of the flag F2 is 1. At this stage, the value of the flag F2 is 1; thus, the result of the determination in step S110 is "YES", and the series of steps in this flow, that is, the series of the steps for draining and purifying the condensed water stored in the tank 47, is completed.

The fuel cell system 100 of the second embodiment has the following functions in addition to the functions of the fuel cell system 1 of the first embodiment.

In the fuel cell system 1 of the first embodiment, the reforming reactor 10 and the fuel gas supply passage 21 are basically always in communication with the fuel off-gas passage 25. Therefore, when no condensed water is collected in the water-collecting portions 11a to 14a and 21a, a minute quantity of gas in the reforming reactor 10 and the fuel gas supply passage 21 is drawn via the drain passages 41 to 45, the tank 47, the orifice 48, and the drain passage 49 to the fuel off-gas passage 25. This phenomenon also occurs even after the warming-up of the fuel cell system 1 is complete and the supply of the reformed fuel gas (which is reformed by the reforming reactor 11) to the fuel cell stack 20 is started.

However, in the fuel cell system 100 of the second embodiment, the flow control valve 53 is not opened until a predetermined quantity of the condensed water is stored in the tank 47. While the flow control valve 53 closes, the gas in the reforming reactor 10 and the fuel gas supply passage 21 is not drawn via the drain passages 41 to 45, the tank 47, the orifice 48, and the drain passage 49 to the fuel off-gas passage 25. Therefore, in comparison with the fuel cell system 1 of the first embodiment, the fuel cell system 100 of the second embodiment can more effectively use the fuel gas.

Additionally, in the fuel cell system 100 of the second embodiment, while the catalyst temperature of the catalytic combustor 30 is not equal to or above the lower limit temperature, the flow control valve 53 is closed so as not to drew the condensed water in the tank 47 into the catalytic combustor 30. Therefore, the condensed water can be drawn into the catalytic combustor 30 only when the catalyst of the catalytic combustor 30 is active. In addition, it is possible to prevent the heat necessary to the evaporator 31 from instead being used as the evaporative latent heat of the condensed water; thus, the evaporator 31 can operate normally. Consequently, it is possible to prevent the discharge-restricted components in the condensed water such as HC from being directly discharged into the atmosphere without being purified by the catalyst. In addition, the composition of the fuel gas can be more quickly stabilized.

Figure 4:
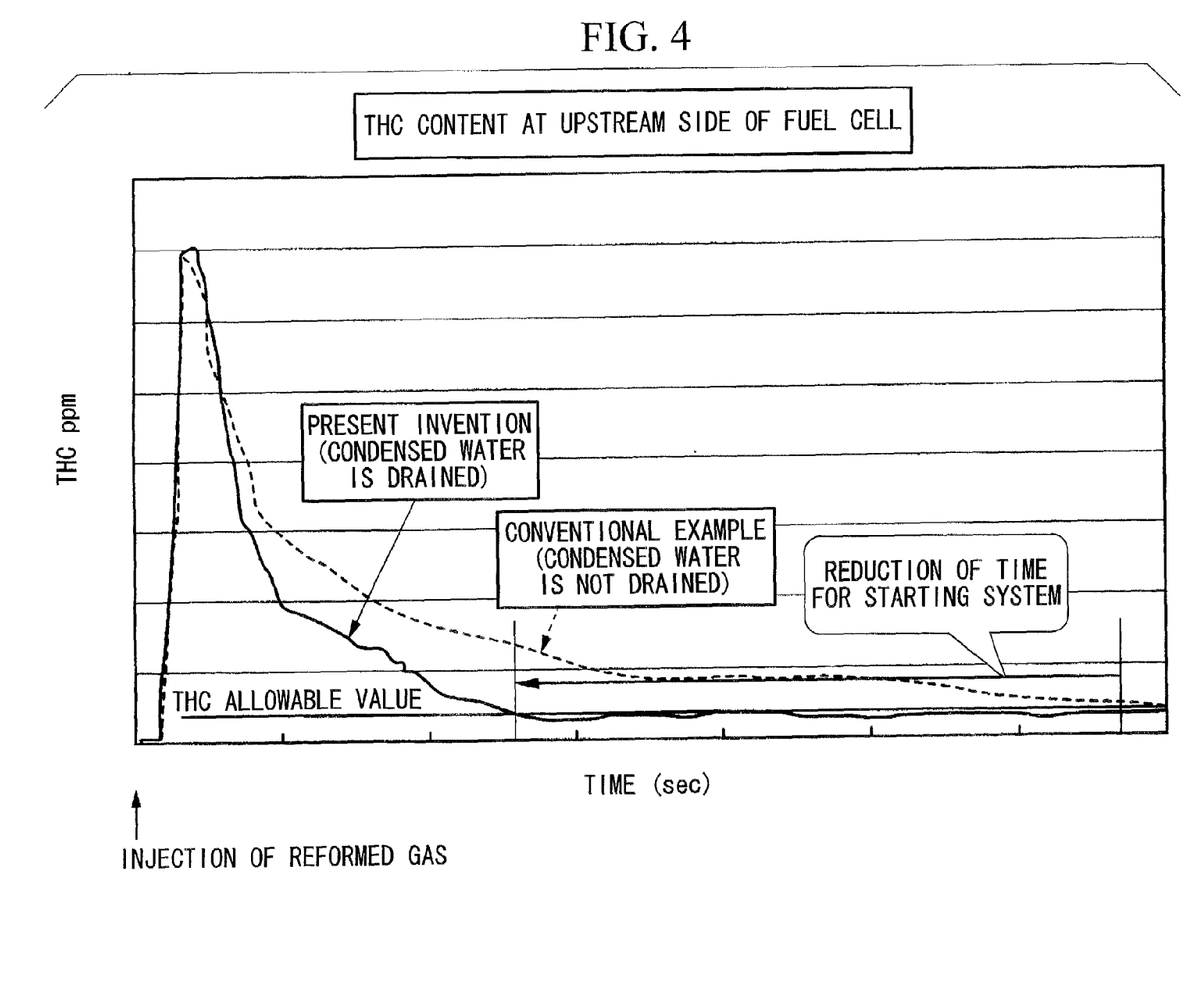
FIG. 4 is a graph showing the changes in the THC content in the gas at the upstream side of the fuel cell stack measured at the start of the fuel cell system.

FIG. 4 is a graph showing the changes in the THC (total hydrocarbon) content in the gas at the upstream side of the fuel cell stack (i.e., the downstream side of the reforming reactor) measured at the start of the fuel cell system. In the graph, the conventional structure, in which the condensed water in the reforming reactor 70 is not drained, and the structure according to the present invention (see the first or second embodiment), in which the condensed water in the reforming reactor 10 is drained, are compared. As clearly shown in FIG. 4, the fuel cell system of the present invention can more quickly stabilize the composition of the reformed gas in comparison with the conventional fuel cell system.

The purifier is not limited to catalytic combustors. For example, if a membrane for separating water and components other than water, for example, an ion hydrate membrane such as Nafion (trademark of Dupont), can be used, the components other than water may be extracted using such a membrane, and the extracted components may be purified using a burner or the like.

What is claimed is:

1. A fuel cell system having a reforming reactor, the system comprising:
   a fuel cell for generating power by using a supplied fuel gas and oxidizing gas;
   a reforming reactor for reforming original fuel gas so as to produce a reformed fuel gas which is supplied to the fuel cell;

a drain for condensed water stored in the reforming reactor;

a water-collecting portion which is formed by a plurality of sloped portions and which is provided at the bottom of the reforming reactor, wherein the drain is connected to the water-collecting portion; and a purifier for the condensed water, the purifier being a combustor for off-gas discharged from the fuel cell.

2. A fuel cell system as claimed in claim 1, further comprising:

a tank, provided at the downstream side of the drain, for storing the condensed water.

3. A fuel cell system as claimed in claim 2, further comprising:

a flow control device, provided at the downstream side of the tank, for controlling the flow of the condensed water, wherein the purifier is provided at the downstream side of the flow control device.

4. A fuel cell system as claimed in claim 3, further comprising:

a water-level detector, attached to the tank, for detecting the water level of the condensed water stored in the tank, wherein:

the flow control device is a flow control valve; and the flow control valve is controlled based on detected results of the water-level detector.

5. A fuel cell system as claimed in claim 3, further comprising:

a purification determining section for determining whether purification of the condensed water by using the purifier is possible in the current state of the fuel cell system, wherein:

the flow control device is a flow control valve; and the flow control valve is controlled based on determined results of the purification determining section.

6. A fuel cell system as claimed in claim 3, wherein the flow control device is an orifice.

7. A fuel cell system having a reforming reactor, the system comprising:

a fuel cell for generating power by using a supplied fuel gas and oxidizing gas;

a reforming reactor for reforming original fuel gas so as to produce a reformed fuel gas which is supplied to the fuel cell;

a drain for condensed water stored in the reforming reactor, wherein:

the reforming reactor comprises a plurality of serially-connected functional elements;

a water-collecting portion which is formed by a plurality of sloped portions and which is provided at the bottom of each functional element of the reforming reactor, wherein the drain is connected to the water-collecting; and a purifier for the condensed water, the purifier being a combustor for off-gas discharged from the fuel cell.

8. A fuel cell system as claimed in claim 7, wherein the functional elements include a heat exchanger for decreasing the temperature of the fuel gas.

9. A fuel cell system as claimed in claim 7, wherein the functional elements include a CO remover for oxidizing CO included in the fuel gas so as to generate $CO_2$.

10. A fuel cell system as claimed in claim 1, wherein the combustor is a catalytic combustor.

11. A fuel cell system as claimed in claim 5, wherein:

the combustor is a catalytic combustor; and the purification determining section determines that the purification of the condensed water using the purifier is possible if the temperature of catalyst of the catalytic combustor is equal to or above a predetermined temperature and the water level of the condensed water in the tank is equal to or above a predetermined level.

12. A fuel cell system having a reforming reactor, the system comprising:

a fuel cell for generating power by using a supplied fuel gas and oxidizing gas;

a reforming reactor for reforming original fuel gas so as to produce a reformed fuel gas which is supplied to the fuel cell;

a drain for condensed water stored in the reforming reactor;

a water-collecting portion which is formed by a sloped portion and which is provided at the bottom of the reforming reactor, wherein the drain is connected to the water-collecting portion; and a purifier for the condensed water, the purifier being a combustor for off-gas discharged from the fuel cell.

13. A fuel cell system as claimed in claim 12, further comprising:

a tank, provided at the downstream side of the drain, for storing the condensed water.

a flow control device, provided at the downstream side of the tank, for controlling the flow of the condensed water; and a purifier for the condensed water, the purifier being provided at the downstream side of the flow control device.

14. A fuel cell system as claimed in claim 13, further comprising:

a water-level detector, attached to the tank, for detecting the water level of the condensed water stored in the tank, wherein:

the flow control device is a flow control valve; and the flow control valve is controlled based on detected results of the water-level detector.

15. A fuel cell system as claimed in claim 13, further comprising:

a purification determining section for determining whether purification of the condensed water by using the purifier is possible in the current state of the fuel cell system, wherein:

the flow control device is a flow control valve; and the flow control valve is controlled based on determined results of the purification determining section.

16. A fuel cell system having a reforming reactor, the system comprising:

a fuel cell for generating power by using a supplied fuel gas and oxidizing gas;

a reforming reactor for reforming original fuel gas so as to produce a reformed fuel gas which is supplied to the fuel cell;

a drain for condensed water stored in the reforming reactor;

a water-collecting portion which is provided at the bottom of the reforming reactor, wherein the drain is connected to the water-collecting portion; and a purifier for the condensed water, the purifier being a combustor for off-gas discharged from the fuel cell.

* * * * *